(12) United States Patent
Van Hattem (10) Patent No.: US 8,039,033 B2
(45) Date of Patent: Oct. 18, 2011

(54) METHOD AND DEVICE FOR PREPARING COFFEE

(75) Inventor: Marcel Van Hattem, Ormeau (AU)

(73) Assignee: Coffee Innovation Group B.V., Naarden (NL)

( * ) Notice: Subject to any disclaimer, the term of this patent is extended or adjusted under 35 U.S.C. 154(b) by 792 days.

(21) Appl. No.: 11/912,199

(22) PCT Filed: Apr. 22, 2005

(86) PCT No.: PCT/NL2005/000300
§ 371 (c)(1),
(2), (4) Date: May 19, 2008

(87) PCT Pub. No.: WO2006/112691
PCT Pub. Date: Oct. 26, 2006

(65) Prior Publication Data
US 2010/0266739 A1      Oct. 21, 2010

(51) Int. Cl.
*A47J 31/22* (2006.01)
(52) U.S. Cl. .................. 426/433; 99/287; 99/302 C
(58) Field of Classification Search .............. 426/433; 99/302 C, 287
See application file for complete search history.

(56) References Cited

U.S. PATENT DOCUMENTS

| 4,464,982 A | * | 8/1984 | Leuschner et al. .............. 99/287 |
| 4,473,002 A | * | 9/1984 | Leuschner et al. .......... 99/302 C |
| 4,476,776 A | * | 10/1984 | Greutert et al. ............. 99/302 C |
| 4,962,693 A | * | 10/1990 | Miwa et al. ..................... 99/283 |

FOREIGN PATENT DOCUMENTS

| DE | 2151920 A1 | | 4/1973 |
| DE | 3529053 A1 | | 2/1987 |
| DE | 3719962 C1 | | 6/1988 |
| EP | 280794 | * | 9/1988 |
| EP | 0749713 A1 | | 12/1996 |
| JP | 02124111 | * | 5/1990 |
| NL | 1024594 C | | 4/2005 |

* cited by examiner

*Primary Examiner* — Anthony Weier
(74) *Attorney, Agent, or Firm* — Hoffmann & Baron, LLP (57) ABSTRACT

Device (1) for the preparation of coffee, wherein a water/coffee powder mixture is introduced into a cylindrical space (10). The cylindrical peripheral wall (15) is made as a vertical screen and by rotation/centrifugation the prepared beverage is forced through the filter to the outside, whilst granular coffee material remains behind. The top part (17) and the bottom part (19) of the holder (16) are made such they can be moved with respect to the cylinder wall. The motor (26) for rotation is above or below the top part or, alternatively, bottom part. Furthermore, there is a construction for producing the displacement of the top part or bottom part of the holder with the same motor.

23 Claims, 6 Drawing Sheets

METHOD AND DEVICE FOR PREPARING COFFEE

CROSS-REFERENCE TO RELATED APPLICATIONS

This application is the National Stage of International Application No. PCT/NL2005/000300, filed Apr. 22, 2005, the contents of which is incorporated by reference herein.

FIELD OF THE INVENTION

The present invention relates to a device for preparing coffee beverage, comprising a holder that can be rotated about an essentially vertical axis, with a motor for driving said holder, which holder comprises a rotary bottom part and a peripheral wall part extending around it, wherein said peripheral wall part is made as a filter for retaining coffee and allowing the beverage prepared to pass through, wherein said part of said peripheral wall part that is made as a filter extends essentially parallel to said axis of rotation, and a top part and wherein said top part or bottom part can be moved linearly in the direction of said axis of rotation along said peripheral wall part made as a filter and provided with removal means for removing powder from said filter, there being arranged a stationary collection chamber for used powder and a discharge adjoining said filter for the prepared beverage.

More particularly the present invention relates to a device wherein a mixture consisting of brewed coffee and coffee powder is separated with centrifugal force. Such a mixture is obtained by bringing hot water and coffee powder together for a defined time. The water is then forced through a screen, on which screen powder material is present. In the prior art devices operating with centrifugal force are proposed where the powder material is forced onto the screen by the centrifugal force and the water is then forced through the powder material.

BACKGROUND OF THE INVENTION

Such a device is disclosed in GB 1 506 074. In this publication a rotary holder part is described, the rotation of which is achieved with a motor, which is not shown and which is connected via a V-belt to a pulley located beneath the bottom part. The rotation shaft is of hollow construction and a shaft can move up and down inside it under the influence of a magnet fitted outside it in order to be able to open the holder part to remove or supply coffee.

This is a complex construction that takes up a great deal of space and moreover is not easy to clean. As a result of the use of a magnet the problem arises that either there is insufficient force for opening the holder or opening takes place with an appreciable jolt.

In the British patent specification, after the water has been propelled through the rotating filter with the powder layer thereon it is fed into a coffee collection chamber and from there directly to a discharge, from which a cup of coffee can be drawn off. The collection chamber downstream of the filter is many times larger than the volume of a single cup of coffee.

SUMMARY OF THE INVENTION

The aim of the present invention is to increase the yield from the coffee powder and to improve the taste of the beverage to be prepared.

This aim is realised with a device as described above in that an outlet from said cylinder with a smaller flow surface area than the free flow surface area of said filter is arranged between said filter and said discharge.

As a result of the presence of an outlet with a small opening compared with the free cross-sectional surface area of the filter, an increase in the pressure of the water is produced. That is to say the prepared beverage that issues from the filter is not able to drain away into the discharge unimpeded. As a result the residence time of the water in the filter and thus in the coffee powder in contact with the filter is increased, as a result of which there is more time to transfer the taste/aroma of the coffee powder to the water and to prepare an optimum beverage. The volume between the filter and the outlet is many times smaller than the minimum portion between the beverage, so that this phenomenon occurs under all conditions.

According to a further advantageous embodiment of the invention the free cross-sectional surface area of the outlet is approximately 2000× smaller than the free cross-sectional surface area of the filter. According to a further preferred embodiment the total cross-sectional surface area of the outlet is 2-20 mm$^2$ and in particular approximately 5-12 mm$^2$.

According to a further advantageous embodiment of the invention the cylinder is made such that it extends vertically and the outlet for the prepared beverage is arranged at the top, which further increases the residence time of the prepared beverage in the cylinder.

By means of the present invention it is possible to force water through the powder and the filter at an appreciable pressure (depending on the rotational velocity of the cylinder).

More particularly, according to the present invention it is possible to influence this pressure by changing the speed of revolution of the cylinder. Thus, it is possible to obtain pressures of 5 bar and above at high speeds of revolution, as a result of which espresso can be prepared in a simple manner.

Using the present invention it is possible to produce a very well prepared beverage within a very short time. More particularly, very intensive contact with the coffee can be achieved within a few seconds. As a result, at high speed minimum amounts of coffee can suffice, whilst a beverage is prepared that meets the most stringent requirements.

According to a particular variant embodiment of the invention the motor of the device has a drive shaft that is coincident with the axis.

According to the present invention a motor located alongside the actual brewing unit is no longer provided, but this motor is positioned in line with the axis. The motor can be arranged either above or below the brewing unit, depending on the design thereof.

According to a particular embodiment of the invention displacement of the bottom part or top part in the longitudinal direction of the axis is achieved with the same rotary motor. As a result the magnet construction known from the state of the art can be dispensed with. Such a drive can, for example, comprise a screw spindle construction in combination with a nut. Such a nut can be made in the form of a simple pin that engages in the screw spindle.

With the present invention it is possible, in principle, to produce both the mutual displacement of the bottom/top part with respect to peripheral wall part and the rotary movement of the holder consisting of peripheral wall part and bottom part (including top part) using a single rotary motor.

The peripheral wall part is preferably provided with a conically widening part in the direction of flow of the water downstream of the screen. This part widens conically towards an outlet positioned at a high level in such a way that when it does not rotate water is not able to escape from the holder formed by peripheral wall part and bottom part, but on rotation the water, i.e. the prepared coffee, moves obliquely upwards and can be discharged through the outlet.

The water/powder mixture can be introduced in the holder delimited by bottom part and peripheral wall part in any manner known in the art. However, according to an advantageous embodiment of the invention the top part is provided with slit-shaped openings through which this mixture is able to enter.

The present invention comprises a particularly simple construction with particularly few components that can be made compact and is self-cleaning to a high degree. As a result maintenance is not necessary and high reliability in operation is obtained. According to the invention it is possible to work both "downwards" and "upwards". In this first case the coffee will be discharged downwards and in the second case upwards when it is removed.

According to the present invention the peripheral wall part acting as a screen is arranged essentially parallel to the axis of rotation. In practice this will preferably be essentially vertical. During preparation of the coffee a closed chamber is formed by the peripheral wall part, the bottom part and the top part. According to the present invention the top part is made such that it can move and is able to skim along the filter wall. The peripheral edge of the top part is provided with cleaning means, as a result of which residual coffee material is pushed downwards or upwards in a guaranteed manner. This is achieved in that, according to a particular embodiment of the invention, the removal means for the used coffee material comprise scraper means that engage on the peripheral wall part and more particularly are deformable to some extent. Discharge of used coffee material can take place in some way or other known in the art. However, according to an advantageous embodiment the bottom part or, alternatively, top part is made such that it can move. In the position where there is no engagement with the peripheral wall part there is a gap between the peripheral wall part and the bottom part and by, for example, rotation of the bottom part coffee material present thereon can be propelled outwards and discharged. It has been found that optimum preparation of coffee can take place as a result of the vertical positioning of the screen. Water is forced/thrown at optimum speed against the screen and moves outwards through the coffee material located here.

According to a further advantageous embodiment of the invention the top part and bottom part are rigidly connected to one another. Preferably an internal threaded part is included in said connection, which part is in engagement with a pin-shaped part provided with external screw thread that is driven in rotation. As a result the mutual displacement of top part and bottom part with respect to the peripheral wall part as described above can be achieved with a drive motor. By also providing this construction with stops it is possible to make provision for the straight-line movement to be converted at the end of the mutual displacement of top part/bottom part with respect to peripheral wall part into a rotary movement where the peripheral wall part also rotates.

According to a further particular variant of the invention the removal means comprise further scraper means for cleaning the collection chamber. That is to say used powder material propelled outwards is removed from the wall of the collection chamber in a mechanical manner. As a result the device can be kept continuously clean in a simple manner and manual maintenance is not necessary.

More particularly, these further scraper means are constructed as a fan. This fan is so designed that it generates a blowing action that drives the powder in the correct direction into the collection chamber for used powder, as a result of which the discharge thereof is further promoted.

According to a further variant of the invention cylinder, top part, bottom part and the components contained therein are constructed as a unit that can be removed from the motor. This unit can easily be cleaned, for example in a dishwasher.

The present invention also relates to a method for the preparation of coffee by applying a layer of coffee powder to a filter, rotating the filter when supplying water and moving said water by centrifugal force through said powder and said filter, wherein downstream of said filter the flow of the prepared beverage is impeded in order to build up a pressure gradient. More particularly, the pressure of the water that moves through the coffee powder is controlled by regulating the centrifugal effect and the taste of the coffee can be influenced depending thereon.

BRIEF DESCRIPTION OF THE DRAWINGS

The invention will be explained in more detail below with reference to an illustrative embodiment shown in the drawing. In the drawing.

DETAILED DESCRIPTION OF PREFERRED EMBODIMENTS

In the figures the device according to the present invention is indicated in its entirety by 1. This forms part of a larger coffee machine. Only parts of interest for the present invention are shown in the figures. There is a stationary housing 2 provided with a discharge 3 for brewed coffee. This discharge 3 is part of an annular channel 4.

There is an inlet for a coffee/water mixture, which is indicated by 5. Water is introduced via pipe 6. This water will be heated water. Coffee is introduced via inlet 8, which, for example, is constructed as a screw conveyor 8. This mixture moves via stationary inlet 5 downwards as a result of gravity and passes into annular channel 9. There is a holder that is fitted such that it can rotate. This consists of a cylinder 10 with a top wall 11. A piston 16 consisting of a top surface or top wall 17 and a bottom wall or bottom surface 19 is fitted in the cylinder 10.

Figure 1:
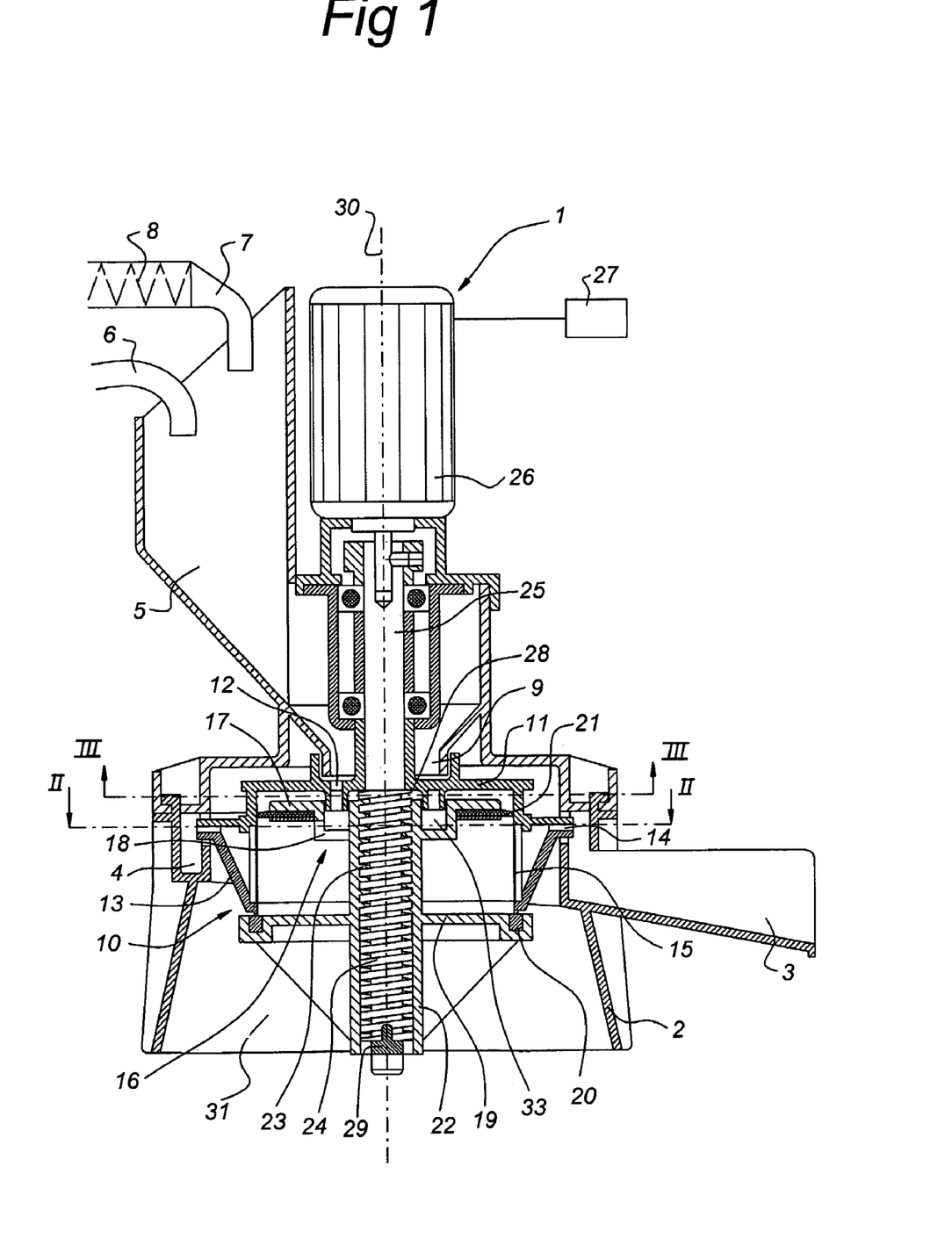
FIG. 1 shows, partially in section, a side view of a device according to the present invention in the position for the preparation of coffee.
Figure 2:
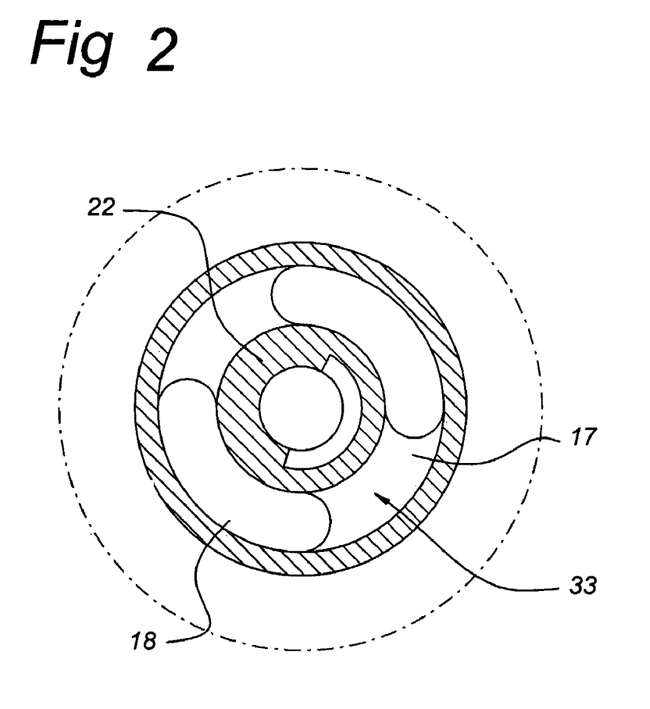
FIG. 2 shows a cross-section along the line II-II.

In FIG. 2 the top wall 11 of the cylinder is shown in cross-section. It can be seen from this figure that there are slits 12 which, as can be seen from FIG. 1, adjoin the annular channel 9.

Figure 3:
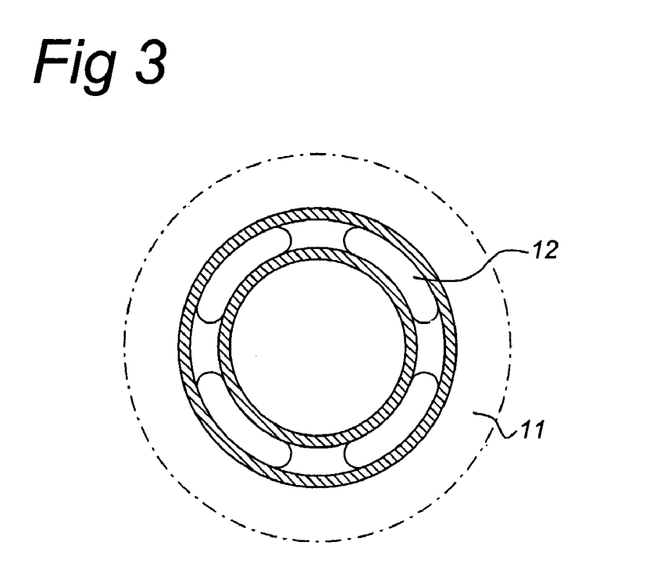
FIG. 3 shows a cross-section along the line III-III in FIG. 1.

A cross-section of the top surface 17 of the piston 16 is shown in FIG. 3. It can be seen from this figure that there are slits 18 that are in line with slits 12. As can be seen from FIG. 1, a further annular channel 33 is delimited between the top surface 17 and the top wall 11 of the cylinder.

That is to say, the powder/water mixture in the annular channel is able to move through the slits 12 and 18 and passes into the space delimited between cylinder 10 and piston 16.

Cylinder 10 consists of a wall 13 that widens conically from bottom to top and opens into an annular outlet 14 that emerges in the annular channel 4. The cylinder is furthermore provided with an essentially vertical screen wall 15.

The piston 16 consists of the abovementioned top surface 17 that is provided close to the periphery with a brush or skimmer lip 21. The bottom surface 19 is provided with a seal 20 that engages on the underside of the cylinder 10, as can be seen from FIG. 1.

Top surface 17 and bottom surface 19 are connected by a sleeve 22. This is partially provided with an internal screw thread 23 that engages on the external screw thread of a spindle 24 that is connected to a shaft 25 of a motor 26. Spindle and shaft are essentially located on the axis 30. The spindle 24 is provided with a stop 29 at the bottom.

At the bottom of the housing there is a discharge 31.

The device described above functions as follows.

Starting from the position shown in FIG. 1, hot water is introduced through inlet 6 and coffee powder via inlet 7. This passes via annular channel 9 and the slits 12, 18 into the closed space delimited by the top surface 17, the bottom surface 19 and the screen wall 15. During or after introduction the motor is rotated in a direction such that sleeve 22 is pulled upwards by spindle 24. However, because the bottom surface 19 engages on cylinder 16, via seal 20 further upward movement is not possible and on rotation of the spindle 24, and thus sleeve 22, cylinder 10 will also be rotated. As a result of this rotation a centrifugal force is exerted on the mixture that is inside the space described above and coffee material will be propelled against the screen 15 and water, i.e. brewed coffee, will then be forced outwards through it and flow obliquely upwards via the walls 13 and via outlet 14 and annular channel 4 emerge into outlet 3 for tapping off coffee. Because the cross-sectional surface area of outlet 14 is many times smaller than the cross-sectional surface area of the filter 15 pressure build-up of water will occur at the filter 15. This pressure build-up is dependent on the flow rate of the water, that is to say at a higher rotational velocity of the cylinder 10 water will be forced through the powder at a higher pressure. The taste of the coffee can be improved i.e. influenced by this means.

Figure 4:
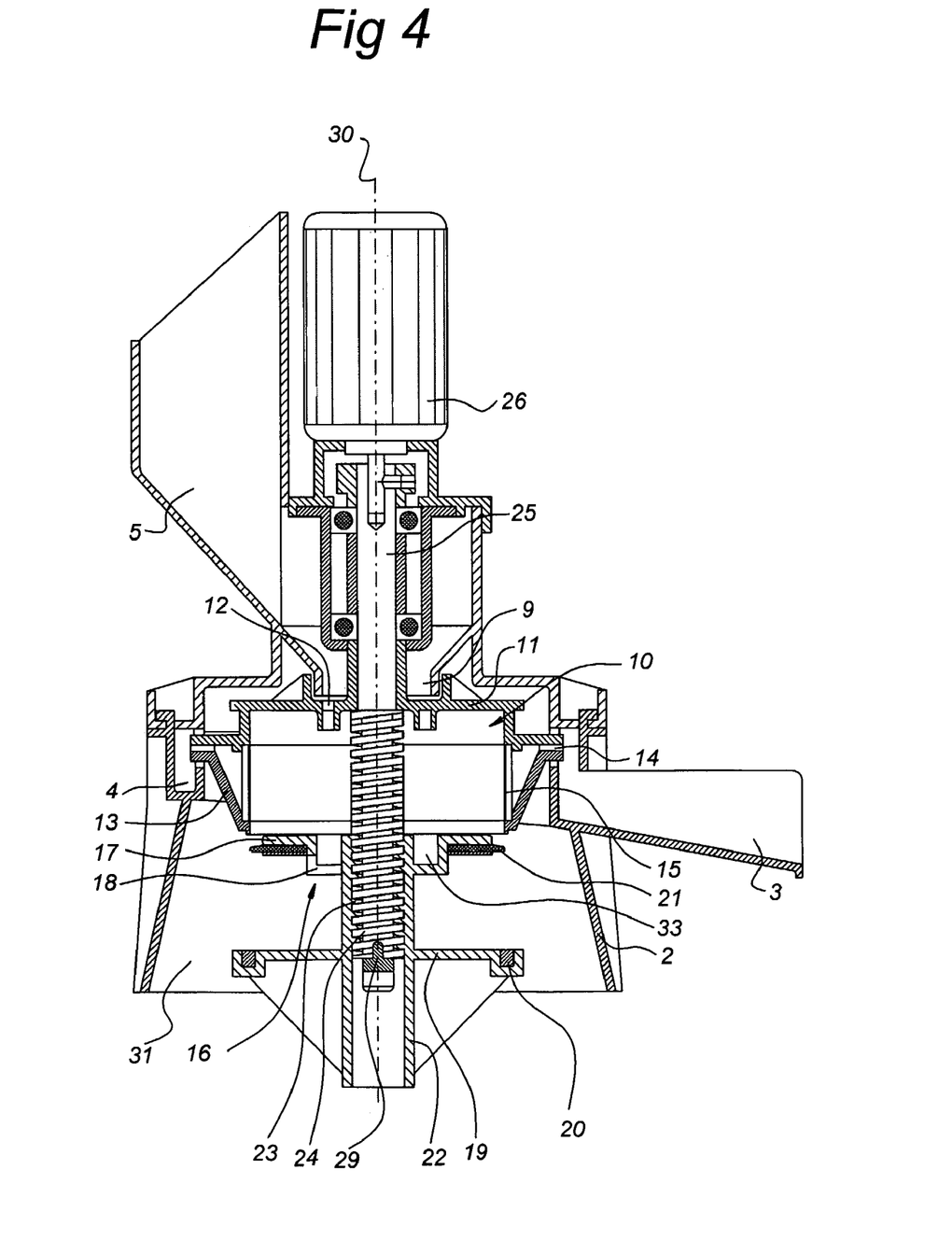
FIG. 4 shows a device according to FIG. 1 in the position when/after cleaning the device.

When essentially all the water has been forced through the coffee after some time the direction of rotation of motor 26 will be reversed. Because this is an abrupt movement, cylinder 10 will want to continue to rotate as a result of the mass inertia, but sleeve 22 will be moved in the opposite direction. As a result any clamping effect close to seal 20 will be overcome and as cylinder 10 will or will not continue to rotate in the original direction (will gradually brake) piston 16 will move downwards. This movement is continued until the position that is shown in FIG. 4 is reached. At that point in time further downward movement will not be possible because of the stop 29. At that point in time the piston 16 will be rotated at full speed in the other direction and any coffee material on the bottom surface 19 and any coffee material clinging to the top surface 17 will be propelled outwards into discharge 31.

During this downward movement brush lip 21 scrapes along the screen wall. As a result coffee material that is clinging to the screen wall thereof is removed and drops onto bottom surface 19 and is then propelled outwards in the manner described above. Optimum cleaning is provided by this means.

Starting from the position shown in FIG. 4 the direction of rotation of motor 26 is again reversed with controller 27 and as a result of the shock/mass inertia sleeve 22 will come away from stop 29 and the piston 16 will move in the upward direction into the position shown in FIG. 1, it being possible to repeat the filling process after engagement of the bottom surface 19 on the cylinder.

Figure 5:
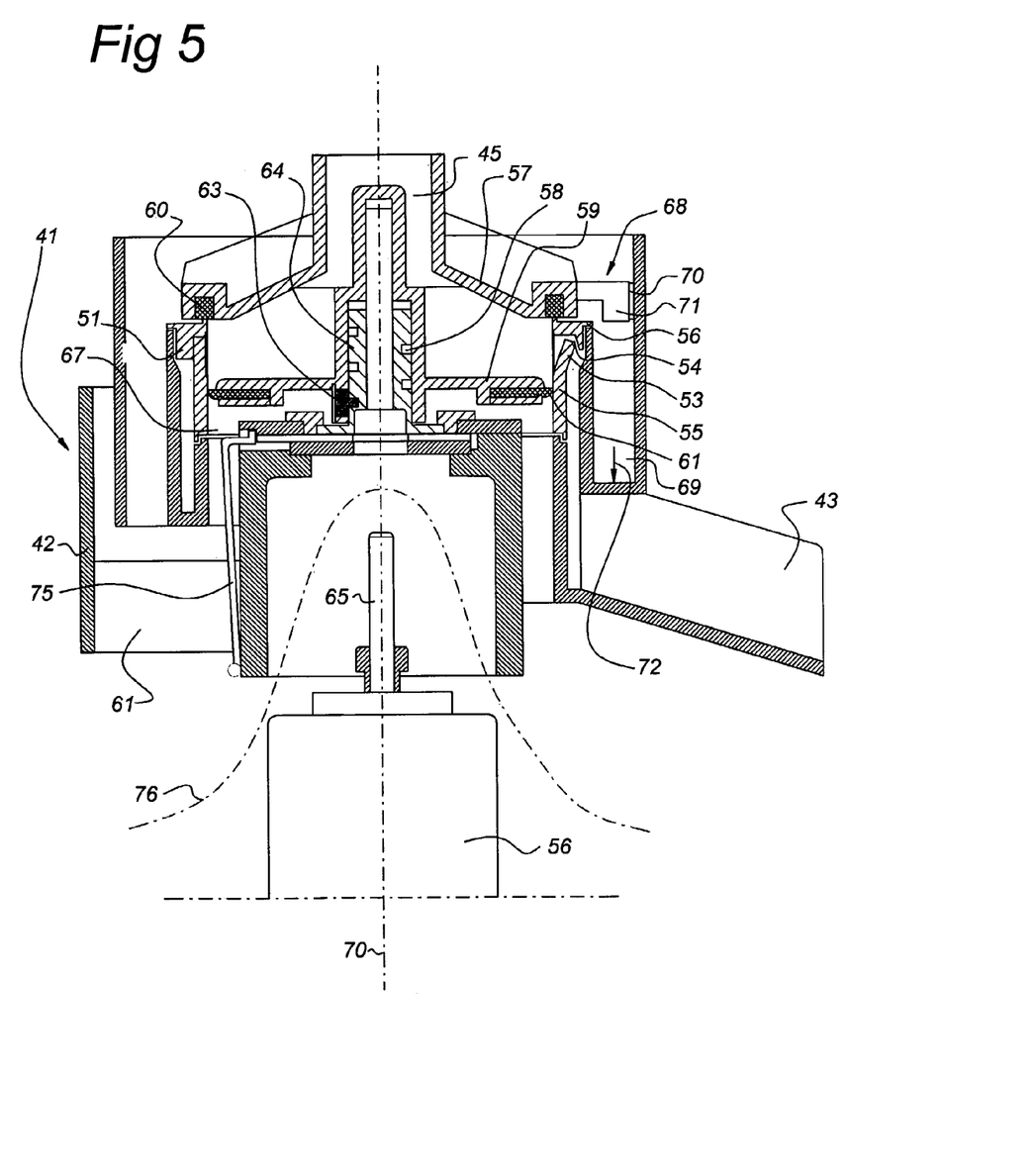
FIG. 5 shows a variant of the device according to the invention in a position corresponding to FIG. 1.

A variant of the device described above is shown in FIGS. 5 and 6, coffee being discharged in the upward direction after use. This variant is indicated in its entirety by 41. Parts corresponding to what has been described with reference to FIGS. 1-4 are not described in detail. There is a stationary housing 42 provided with a discharge 43 for brewed coffee. The inlet for coffee/water is indicated by 45. The metering of coffee is not shown in more detail. As in the embodiment described above there are a bottom part 59 and a top part 57. These are rigidly coupled to one another. Top part 57 is provided with scraper arms 68. As can be seen from FIG. 7, in addition to a lateral scraper surface 70 these have a fan-shaped part 71 made such that on rotation an air flow is generated in collection chamber 69 in the direction of arrow 72. The state where the bottom part 59 is in the low position is shown in FIG. 5. A motor 56 with shaft 65 that is coincident with axis 70 is arranged beneath it. There is a screw spindle 64 in which there is a pin 63 that is joined to the bottom part 59 and acts as a nut. The groove 58 is open at the end so that any contamination between nut 63 and groove 58 can be discharged.

The peripheral wall part is indicated by 55 and at the top consists of a ring 56 beneath which a conical outwardly widening part 53 terminates and between which a number of openings 54 are delimited. Openings 54 emerge into a discharge 43. A scraper lip 61 that engages in a somewhat deforming manner on the peripheral wall part 55 that is made as a screen is connected to the bottom part 59. The top part 57 is provided with a seal 60 that interacts with the peripheral wall part 55 in the position shown in FIG. 6. There are openings 67 that emerge into a discharge 61 for used coffee material. Any coffee material not removed by scraping can be discharged by this means.

Figure 6:
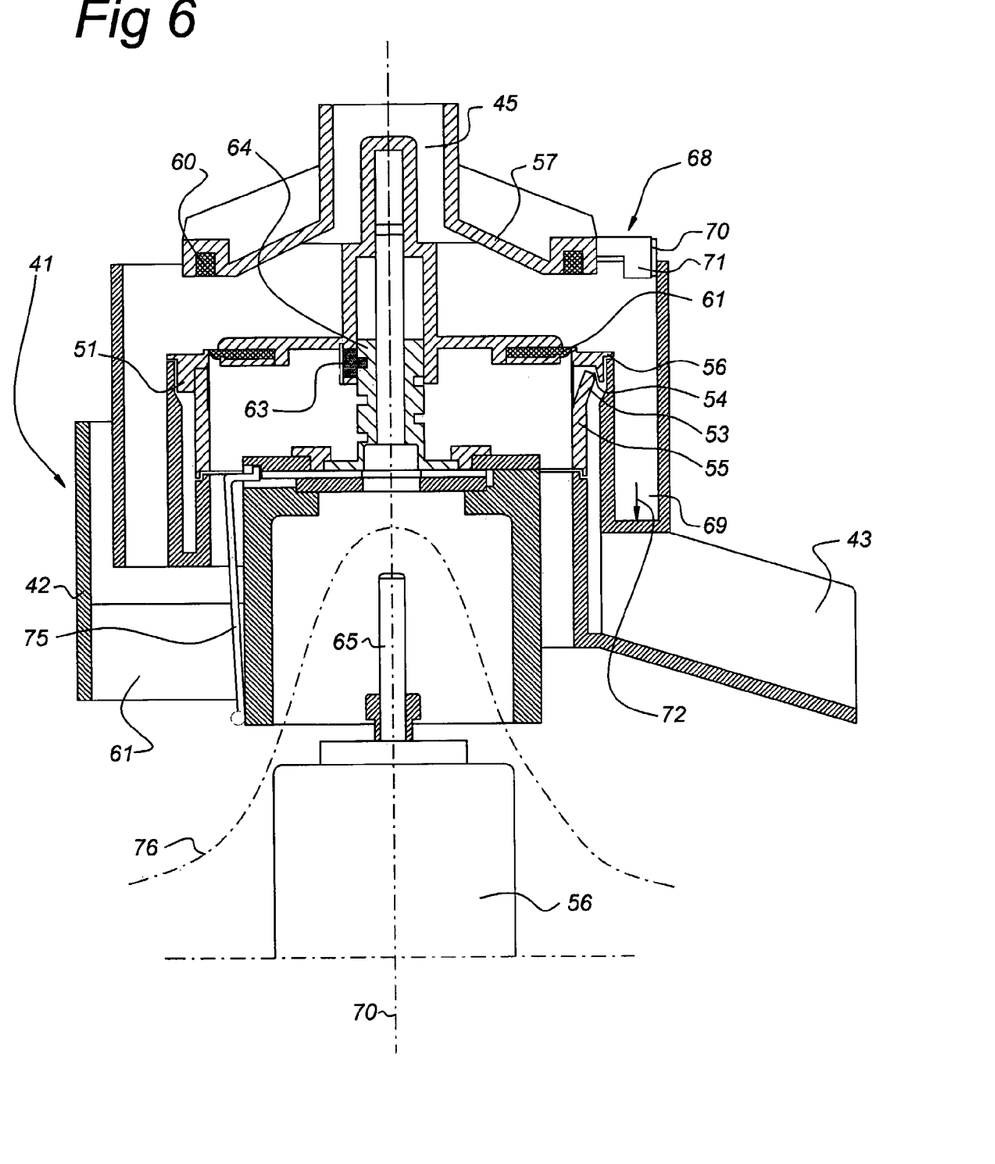
FIG. 6 shows the construction according to FIG. 5 in the state corresponding to FIG. 4.
Figure 7:
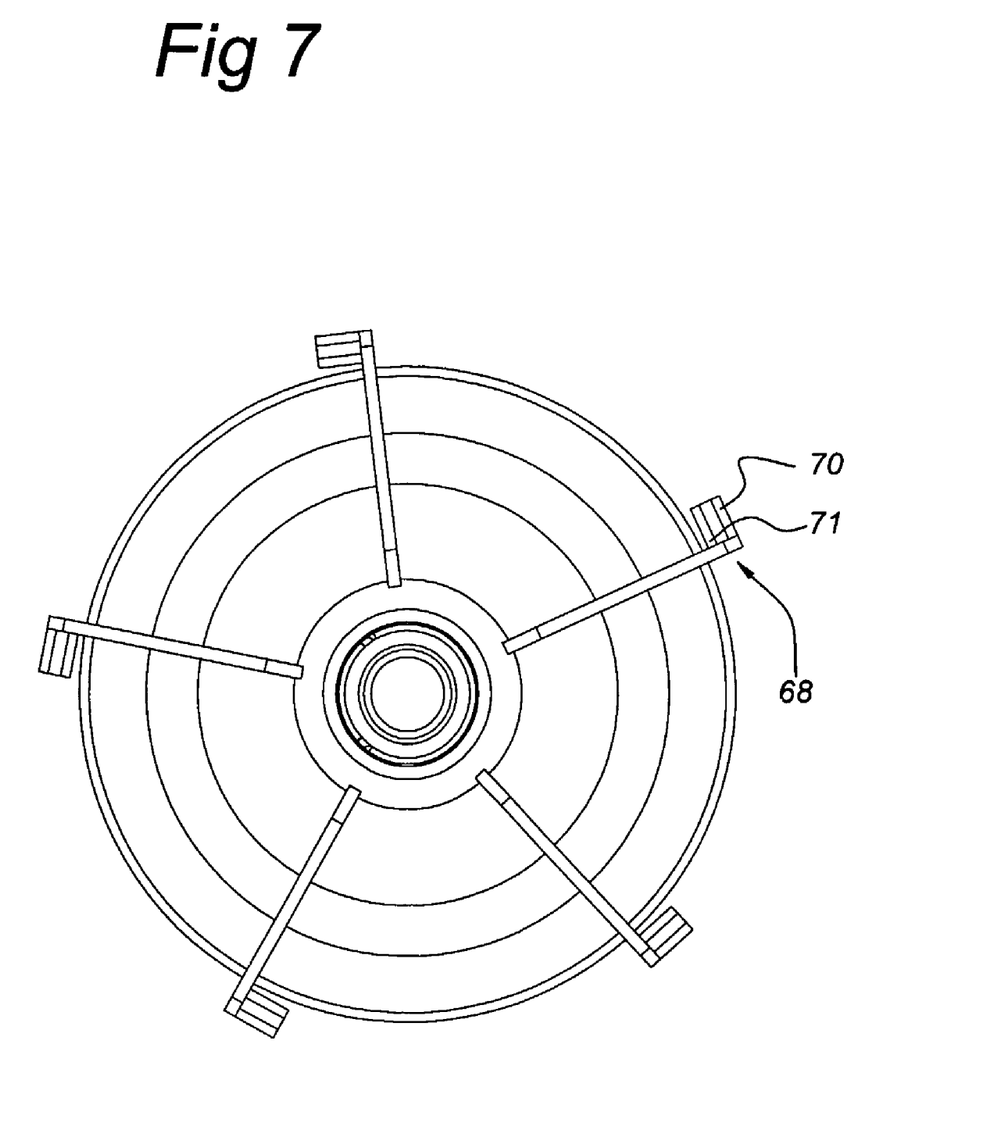
FIG. 7 shows a detail of the construction shown in FIGS. 5 and 6.

In FIG. 6 the construction according to FIG. 5 is shown in the open position. The top part 57 has been moved upwards together with the bottom part 59. By moving bottom part 59 upwards the coffee residues are scraped upwards and on reaching the same level as the ring 56 they are propelled past this and discharged via space 61.

There is a locking construction 75 and by operating this the part of the device located above broken line 76 can be removed from the motor 56. This removable part can be easily cleaned in a dishwasher or in another way and completely submerged in water or other cleaning liquids. The locking mechanism consists of a construction by means of which coupling of motor shaft 65 and bottom part 59 can be achieved in a simple manner without the risk of errors. Furthermore, the construction is such that in principle operation is not possible if complete locking does not take place. A push-and-turn mechanism is one example thereof.

In the manner described above the entire process can be carried out with a single motor. Furthermore, all relevant parts are always cleaned. A particularly high degree of cleaning can be obtained by having the piston rotate at an appreciable speed of revolution. A speed of revolution of 3-4 thousand revolutions per minute is mentioned as an example. However, other values can also be used. The entire process can be carried out in a few seconds and tests have shown that the coffee prepared in this way has a particularly good taste. Moreover, it is possible to choose to have the volume of the holder part smaller than the desired amount of coffee. As a result an optimum thickness can be chosen for the coffee material layer on the peripheral wall part. During the process further water has to be fed in. The volume of the holder can, for example, be one third of the total amount of coffee desired per operation.

Following the above variants will be immediately obvious to those skilled in the art. These fall within the scope of the appended claims.

What is claimed is:

1. A device for preparing coffee beverage, comprising:
   a holder that can be rotated about an essentially vertical axis, with a motor for driving said holder, which holder comprises a rotary bottom part and a peripheral wall part extending around it,
   wherein said peripheral wall part is made as a filter for retaining coffee and allowing the beverage prepared to pass through,
   wherein said part of said peripheral wall part that is made as a filter extends essentially parallel to said axis of rotation, and a top part and
   wherein said top part or bottom part can be moved linearly in the direction of said axis of rotation along said peripheral wall part made as a filter and provided with removal means for removing powder from said filter, there being arranged a stationary collection chamber for used powder and a discharge adjoining said filter for the prepared beverage, wherein an outlet from said holder with a smaller flow surface area than the free flow surface area of said filter is arranged between said filter and said discharge.

2. The device according to claim 1, wherein said flow surface area of said outlet is at least 2000 times smaller than the free flow surface area of said filter.

3. The device according to claim 1, wherein said cylinder extends vertically and said outlet is close to the top of said discharge.

4. The device according to claim 1, wherein said outlet comprises a series of openings.

5. The device according to claim 1, wherein said motor has a drive shaft that is coincident with said axis of rotation.

6. The device according to claim 1, wherein said motor is provided with drive means for linear displacement of said movable top part or movable bottom part.

7. The device according to claim 6, wherein said movable top part or bottom part is provided with a central nut and the drive motor is provided with a screw spindle for reciprocating displacement of said top part or bottom part.

8. The device according to claim 7, further comprising stop means for limiting the mutual rotation of screw spindle and nut.

9. The device according to claim 7, wherein said drive motor is arranged above said top part.

10. The device according to claim 1, wherein said removal means comprise scraper means at the free end that come into contact with said peripheral wall part.

11. The device according to claim 1, wherein said removal means comprise further scraper means for cleaning said collection chamber.

12. The device according to claim 10, wherein said further scraper means are made as a fan.

13. The device according to claim 1, wherein said bottom part, said top part respectively can be moved between a position sealing the peripheral wall and a position remote from the peripheral wall, a discharge gap for coffee powder being delimited between the end limit of the peripheral wall and the bottom part, said top part respectively.

14. The device according to claim 1, wherein said bottom part and top part are rigidly connected to one another.

15. The device according to claim 8, wherein said bottom part and/or said top part engages on said peripheral wall part, which peripheral wall part is arranged such that it can rotate about said axis.

16. The device according to claim 1, wherein said peripheral wall part is arranged in a housing and is provided with a conically widening side wall section that at the top opens into a beverage outlet.

17. The device according to claim 1, wherein said top part is provided with an inlet opening for coffee powder/water.

18. The device according to claim 1, wherein said cylinder a top part and a bottom part are made as a unit that can be removed from said motor.

19. A method for the preparation of a coffee beverage, wherein use is made of a filter having a free flow surface area and an outlet for the coffee beverage downstream of said filter, which method comprises:
   applying a layer of coffee powder to a filter,
   supplying hot water,
   rotating the filter and the outlet and thereby moving said water by centrifugal force through said coffee powder and said filter so as to obtain a coffee beverage and thereby discharging the coffee beverage from the outlet by said centrifugal force,
   wherein the outlet has a flow surface area that is smaller than the free flow surface area of the filter such that the flow of the coffee beverage is impeded by the outlet and a pressure gradient is built up.

20. The method according to claim 19, wherein the flow surface area of said outlet is at least 2000 times smaller than the free flow surface area of said filter.

21. The method according to claim 19, wherein the flow surface area of said outlet is in the range of 2-20 mm$^2$.

22. The method according to claim 19, wherein the flow surface area of said outlet is in the range of 5-12 mm$^2$.

23. The method according to claim 19, wherein the rotation of the filter and the outlet is controlled in order to regulate the centrifugal force and therefore the motion of the water through the coffee powder.

* * * * *